UNITED STATES PATENT OFFICE.

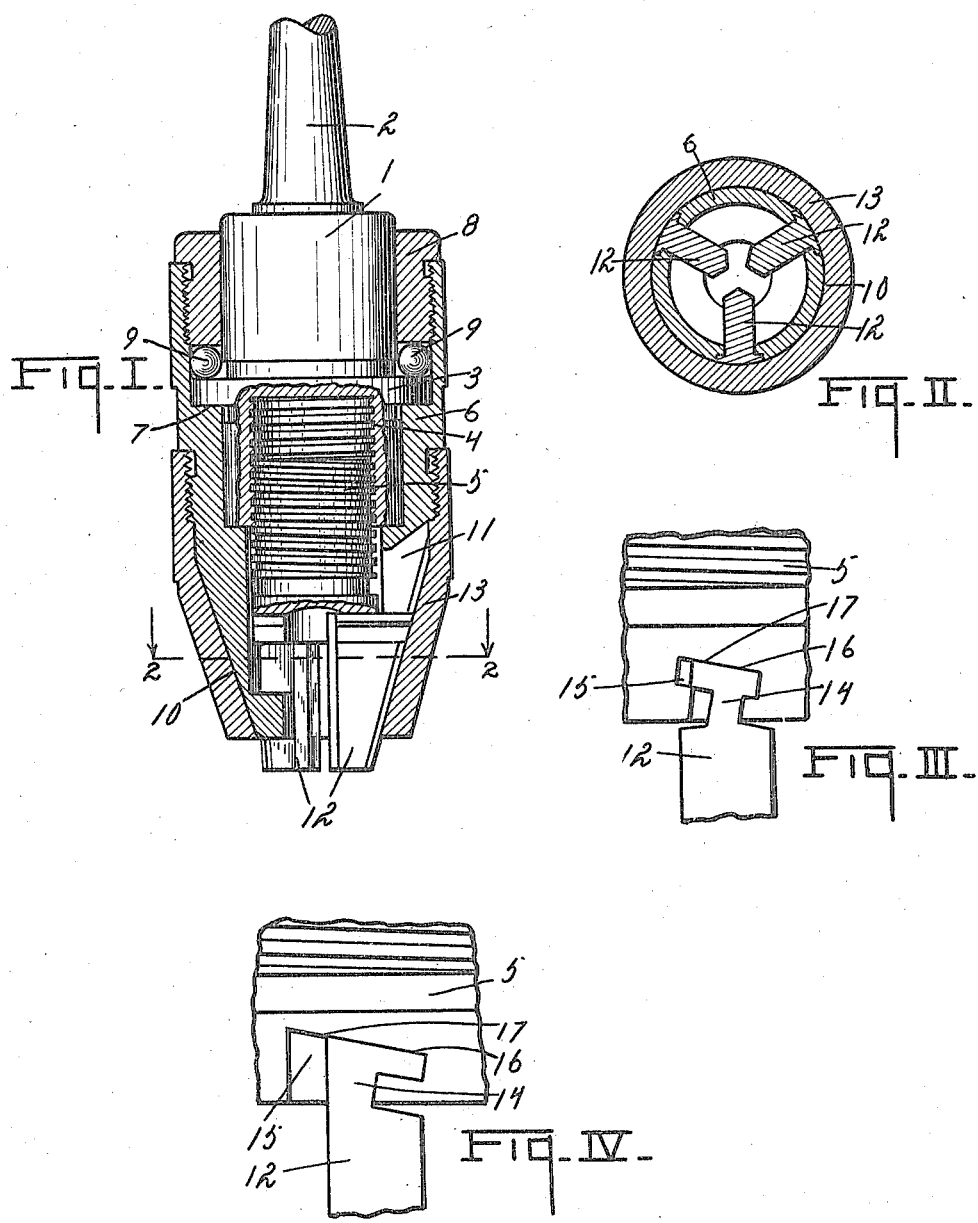

ERNEST C. BOWERS, OF KALAMAZOO, MICHIGAN, ASSIGNOR TO EUGENE COOK, OF KALAMAZOO, MICHIGAN.

CHUCK.

1,264,363.  Specification of Letters Patent.  Patented Apr. 30, 1918.

Application filed August 15, 1916. Serial No. 114,980.

*To all whom it may concern:*

Be it known that I, ERNEST C. BOWERS, a citizen of the United States, residing at the city and county of Kalamazoo, State of Michigan, have invented certain new and useful Improvements in Chucks, of which the following is a specification.

This invention relates to improvements in chucks.

The main objects of this invention are:

First, to provide an improved chuck in which the tool is very securely clamped by the jaws and at the same time one in which the jaws can be easily retracted to release or free the tool.

Second, to provide an improved chuck in which the parts are comparatively simple and economical to manufacture and easily assembled and one which is very durable and not likely to get out of repair.

Further objects, and objects relating to structural details, will definitely appear from the detailed description to follow.

I accomplish the objects of this invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail view of my improved chuck, parts being shown in central longitudinal section.

Fig. II is a transverse section on a line corresponding to line 2—2 of Fig. I.

Fig. III is a detail side elevation of the adjusting member and one of the jaws, showing their relation.

Fig. IV is a similar detail showing a slightly modified construction.

In the drawing similar reference characters refer to similar parts throughout the several views, and the sectional views are taken looking in the direction of the little arrows at the ends of the section lines.

Referring to the drawing, the spindle head 1 is secured to or adapted to receive the driving spindle 2. The spindle head is provided with an annular bearing flange 3 and has an internally threaded socket 4 at its inner end adapted to receive the jaw adjusting member 5.

The shell-like body member 6 is shouldered at 7 to engage the outer side of the bearing flange 3 and is rotatably retained upon the head member by means of the retaining member 8 threaded into the body member above the flange.

Bearing balls 9 are interposed between the retaining member and the bearing flange.

The body member is provided with a tapered inner portion 10 having longitudinal slot-like ways 11 therein for the jaws 12. The jaws are retained in their ways by means of the tapered jaw supporting sleeve 13 which is threaded upon the body member, the sleeve being, in effect, a part of the body member and is formed separately therefrom for convenience in manufacture and assembling the parts.

The jaws 12 are provided with heads 14, preferably T-shaped, as shown in Fig. III, which engage T-shaped radial ways 15 on the adjusting member 5. The heads 14 are inclined and have inclined thrust faces 16, while the ways 15 are inclined and have inclined thrust faces 17 coacting with the inclined faces of the jaws. The ways are of such width as to permit a limited rotative movement of the adjusting member relative to the jaws. The inclined surfaces 16 and 17 are disposed in the direction of the pitch of the threads of the adjusting member and their pitch or angle somewhat exceeds that of the pitch of the threads. The result is that during the initial retracting movement this lost motion connection permits limited rotation of the adjusting member relative to the jaws and owing to the inclined or cam engagement of the adjusting member and jaws the clamping strain is promptly released and the jaws are permitted to retract sufficiently to relieve the binding or clutching thereon, thereby releasing the clutching strain on the adjusting member threads and permitting the parts to move with comparative freedom so that no matter how tightly the jaws may be clamped upon the tool they are freely and easily released.

I have illustrated my improvements in an embodiment which I find very practical. I have not attempted to illustrate or describe various modifications in structural details which I contemplate as I believe the disclosure made will enable those skilled in the art to which my invention relates to embody or adapt the same as may be desired.

Having thus described my invention, what I claim as new and desire to secure by Letters Patent, is:

1. In a chuck, the combination of a head member internally threaded at its inner end and provided with an annular bearing flange, a shell-like body member tapered at its inner end and shouldered to coact with said flange and having longitudinal slot-like jaw ways in its tapered end, a retaining member rotatably mounted on said head member above said bearing flange and threaded into said body member, bearing balls interposed between said bearing flange and said retaining member, jaws arranged in said ways and having laterally inclined T heads, a tapered sleeve for supporting said jaws in their said ways threaded upon said body member, and a jaw adjusting member threaded into said head member and having radial T-shaped ways for said jaw heads, said jaw head ways being inclined in the direction of the pitch of the threads of said adjusting member and at an angle exceeding that of the pitch of the threads and being of greater width than the jaw heads permitting limited rotative movement of the adjusting member relative to said jaws.

2. In a chuck, the combination of a head member internally threaded at its inner end and provided with an annular bearing flange, a shell-like body member tapered at its inner end and shouldered to coact with said flange and having longitudinal slot-like jaw ways in its tapered end, a retaining member rotatably mounted on said head member above said bearing flange and threaded into said body member, bearing balls interposed between said bearing flange and said retaining member, jaws arranged in said ways, a tapered sleeve for supporting said jaws in their said ways threaded upon said body member, and a jaw adjusting member threaded into said head member and having jaw engaging surfaces inclined in the direction of the pitch of the threads of said adjusting member and at an angle exceeding that of the pitch of the threads, there being means permitting limited rotative movement of the adjusting member relative to said jaws.

3. In a chuck, the combination of a head member, a shell-like body member rotatably mounted on said head member and tapered at its inner end and having longitudinal slot-like jaw ways in its tapered end, jaws arranged in said ways and having laterally inclined T heads, a tapered sleeve for supporting said jaws in their said ways threaded upon said body member, and a jaw adjusting member having threaded engagement with said head member and having radial T-shaped ways for said jaw heads, said jaw head ways being inclined in the direction of the pitch of the threads of said adjusting member and at an angle exceeding that of the pitch of the threads and being of greater width than the jaw heads permitting limited rotative movement of the adjusting member relative to said jaws.

4. In a chuck, the combination of a head member, a body member rotatably mounted on said head member and provided with longitudinal jaw ways, jaws arranged in said ways and having laterally inclined T heads, and a jaw adjusting member having threaded engagement with said head member and having radial T shaped ways for said jaw heads, said jaw head ways being inclined in the direction of the pitch of the threads of said adjusting member and at an angle exceeding that of the pitch of the threads and being of greater width than the jaw heads permitting limited rotative movement of the adjusting member relative to said jaws.

5. In a chuck, the combination of a head member, a body member rotatably mounted on said head member and provided with longitudinal jaw ways, jaws arranged in said ways and having laterally inclined heads, and a jaw adjusting member having threaded engagement with said head member and having radial shaped ways for said jaw heads, said jaw head ways being inclined in the direction of the pitch of the threads of said adjusting member and at an angle exceeding that of the pitch of the threads and being of greater width than the jaw heads permitting limited rotative movement of the adjusting member relative to said jaws.

6. In a chuck, the combination of a head member, a body member rotatably mounted on said head member and having longitudinal jaw ways, jaws arranged in said ways, and a jaw adjusting member having threaded engagement with said head member and having jaw engaging surfaces inclined in the direction of the pitch of the threads of said adjusting member and at an angle exceeding that of the pitch of the threads, there being means permitting limited rotative movement of the adjusting member relative to said jaws.

7. In a chuck, the combination of a head member, a body member rotatably mounted on said head member and provided with longitudinal jaw ways, jaws arranged in said ways, and a jaw adjusting member having threaded engagement with said head member and a lost motion engagement with said jaws and having jaw engaging surfaces inclined in the direction of the pitch of the threads of said adjusting member and at an angle exceeding that of the pitch of the threads.

8. In a chuck, the combination of a head member, a body member rotatably mounted on said head member and provided with a longitudinal jaw way, a jaw arranged in said way, and a jaw adjusting member having threaded engagement with said head member and a lost motion engagement with said jaw, said jaw and adjusting member having coacting thrust surfaces inclined in the direction of the pitch of the threads of said adjusting member.

9. In a chuck, the combination of a head member, a body member rotatably mounted on said head member and provided with a longitudinal jaw way, a jaw arranged in said way, and a jaw adjusting member having threaded engagement with said head member and a lost motion engagement with said jaw, said jaw and adjusting member having coacting thrust surfaces, at least one of which is inclined in the direction of the pitch of the threads of said adjusting member.

In witness whereof, I have hereunto set my hand and seal in the presence of two witnesses.

ERNEST C. BOWERS. [L. S.]

Witnesses:
MARGARET L. GLASGOW,
LUELLA G. GREENFIELD.

Copies of this patent may be obtained for five cents each, by addressing the "Commissioner of Patents, Washington, D. C."